Patented Mar. 22, 1932

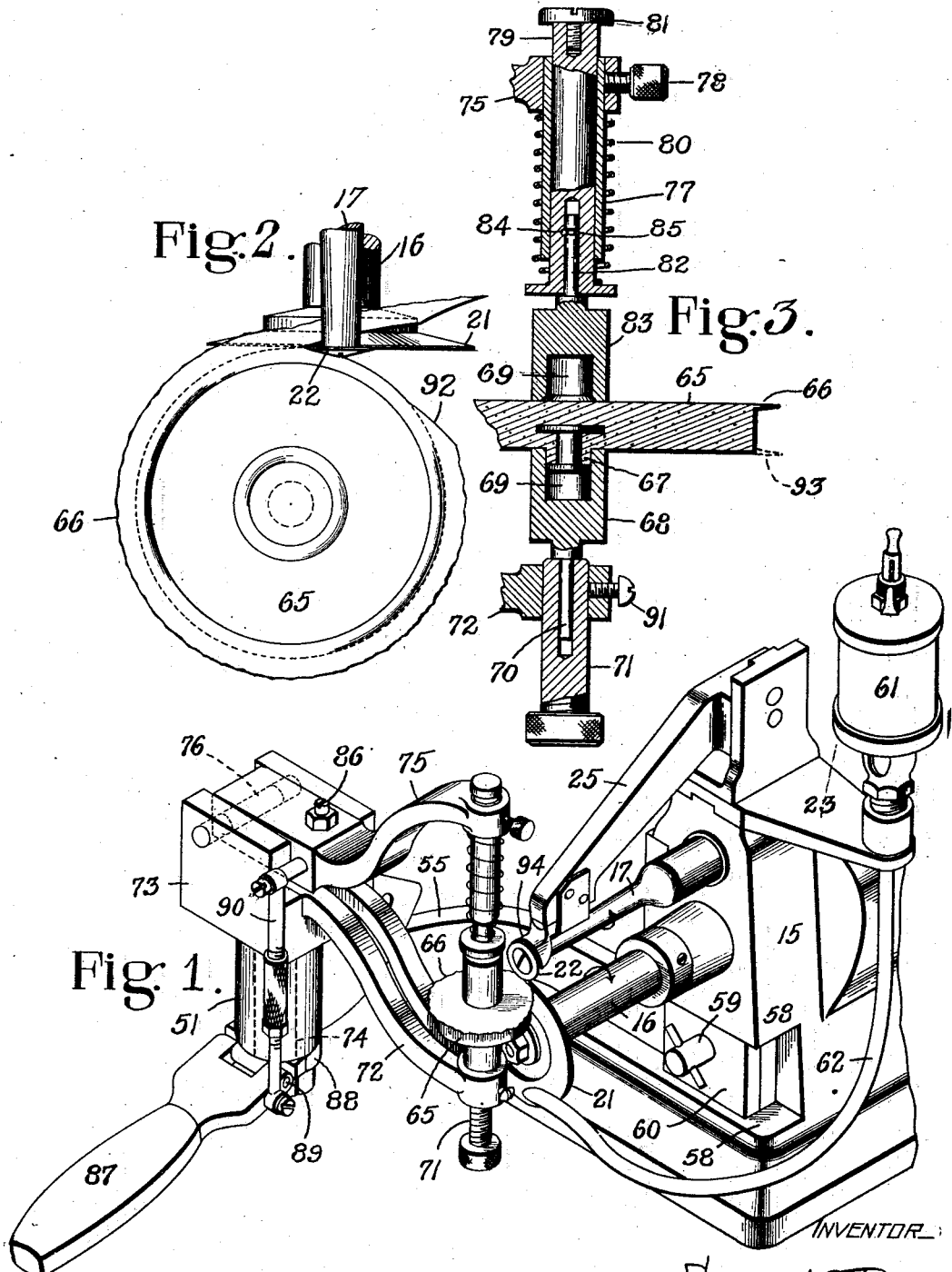
March 22, 1932.　　S. J. FINN　　1,850,097
TRIMMING MACHINE
Filed June 10, 1926　　2 Sheets-Sheet 1

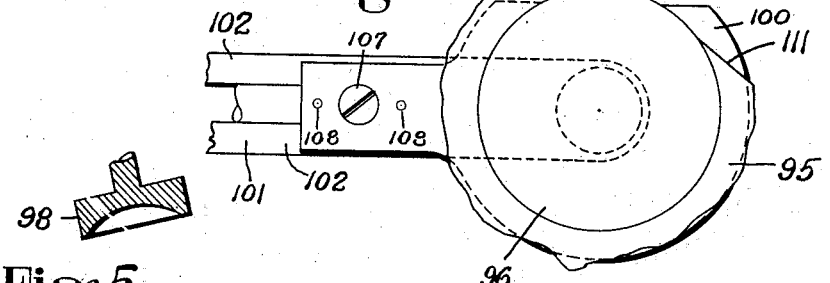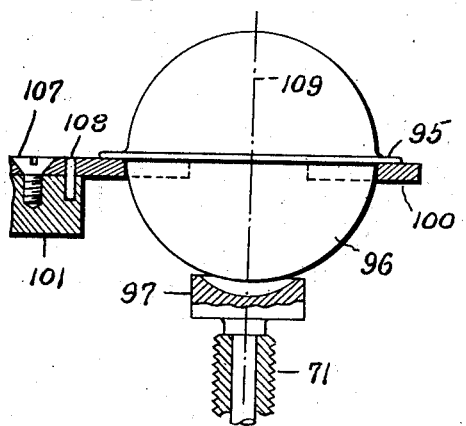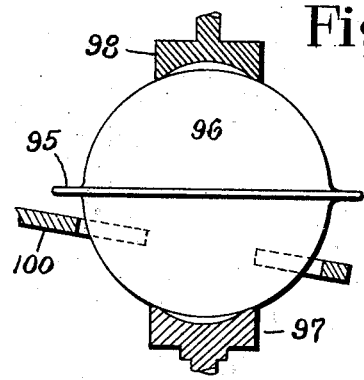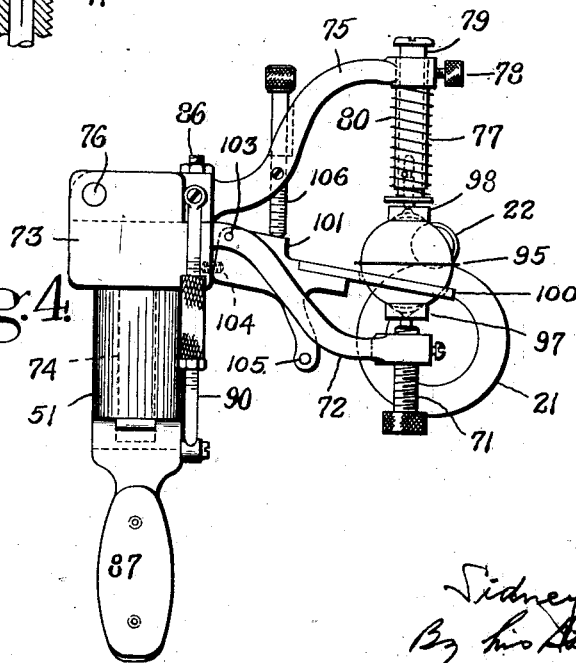

1,850,097

UNITED STATES PATENT OFFICE

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY

TRIMMING MACHINE

Application filed June 10, 1926. Serial No. 115,022.

This invention relates to trimming machines and is herein illustrated as embodied in a machine of the type set forth in United States Letters Patent No. 1,534,257, granted April 21, 1925, on application of J. A. Brogan, for Trimming fins of overflow from molded rubber articles.

Machines of the type referred to are provided with a pair of cooperating rotary disk cutters having circular cutting edges in shearing relation which not only sever the fins of overflow but also feed the articles of work held against them. Although machines of that type have been used extensively to trim fins of overflow from non-circular rubber articles such as rubber heels, the feeding action of the rotary disk cutters may also be utilized to rotate circular articles of work about an axis without requiring the operator's fingers to touch the work while the latter is in contact with the cutters.

It is an object of the present invention to provide an improved machine of the general type referred to, which, without sacrificing any of the advantageous features which have made such machines conspicuously successful, will also do satisfactory work in trimming the overflow from circular rubber articles, such as play-balls and disk-shaped inserts for rubber heels.

With this in view, and since it is practicable to rotate such circular articles about their axes, the present invention provides an overflow trimming machine in the operation of which an article to be trimmed is secured to a rotatable holder by resilient work-engaging means arranged to rotate with the holder. Preferably too, to insure against any risk of injury to the operator when the machine is used to trim articles of such a nature that holding or guiding the work for the trimming might bring the operator's fingers dangerously near the cutters, the illustrated machine is provided with a rotary work holder mounted on a support movable from a work-receiving position removed a safe distance from the cutters to and from a work-presenting position. Thus, work may be safely placed on the holder and secured thereto, and in the operation of the machine the trimming may be performed rapidly and accurately without danger of injury to the operator, since there is no occasion for the operator to have his hands near the cutters during the trimming.

In accordance with a further feature of the invention, for the sake of simplicity, the illustrated machine is provided with an operating handle constructed and arranged to be manipulated both to operate the work-securing means to secure the work to the holder and to move the work holder support to and from work-presenting position.

Moreover, to adapt it for a wide range of utility, the illustrated machine may be provided with a variety of interchangeable work holders and work-securing devices individually especially adapted for the particular requirements of different classes of work. Thus, to adapt the illustrated machine particularly for trimming, for example, an equatorial overflow flange from articles such as rubber balls, it is provided with a work holder comprising a pair of cooperating work-clamping jaws arranged to clamp a rubber ball or the like adjacent to its poles and rotate therewith about its polar axis, together with a ring mounted on one of said jaws to surround the ball and register it relatively to the work holder.

The novel features above referred to and others are shown by the drawings and are hereinafter specifically described.

Referring to the drawings:

Fig. 1 is a perspective view of the front part of a trimming machine provided with an improved rotary work holder especially adapted to hold a disk-shaped article such as a circular adjustable insert for a rubber heel.

Fig. 2 is a top plan view including the cooperative trimming cutters and the article of work shown in Fig. 1.

Fig. 3 is a vertical section including the article of work shown by Figs. 1 and 2, the rotary work holder and rotary means by which the article is secured to the holder while it is being trimmed.

Fig. 4 is a front elevation showing a preferred type of means for holding, registering and presenting a rubber ball relatively to means for trimming an annular fin of overflow therefrom.

Figs. 5 and 6 are vertical sections showing two positions of the work holding and registering means included in Fig. 4.

Fig. 7 is a top plan view of the partially trimmed ball as presented to the trimming means by the holding mechanism shown in Fig. 4.

Inasmuch as the general organization of the illustrated trimming machine is similar to that shown in the aforesaid Letters Patent No. 1,534,257, it will be unnecessary to describe it at length since a general description thereof is given in said patent. The main frame of the machine is indicated at 15 and is provided with bearings for the two cutter shafts 16 and 17. The shaft 17 is driven in a counter-clockwise direction, and its rotation is transmitted to the shaft 16 by gears (not shown) which cause the shaft 16 to turn clockwise and at a speed less than that of the shaft 17.

A disk cutter 21 of relatively large diameter is affixed to the shaft 16 and a disk cutter 22 of relatively small diameter is affixed to the shaft 17, these cutters having circular cutting edges and being arranged to lap each other slightly in shearing relation. The difference between the diameters of the cutters counteracts the difference between the rotational speeds of the shafts to make the peripheral speeds of the cutters substantially equal.

For handling circular disk-shaped articles such as that indicated at 65, the invention provides improved work-presenting means of the construction shown in Figs. 1 and 3. The article 65 is a circular insert for a rubber heel and in the molding thereof a flange 66 is commonly formed by the surplus rubber that overflows into the crevice between the parts of the mold. It therefore becomes necessary to trim off this flange 66 flush with the body of the article before the latter can be used. Another characteristic of articles of this kind is a central stud portion 67 by which the insert is secured to the base of the heel with which it is to be used. This stud portion 67 may conveniently be utilized to center the article 65 relatively to a rotatable holder for supporting the article while the flange 66 is being trimmed off.

As shown by Fig. 3, the article 65 is supported by a rotatable holder 68 having a cylindric cavity 69 to receive the stud portion 67. The holder 68 is arranged to rotate freely about a substantially vertical axis, and for this purpose it is provided with a stem 70 journaled in a supporting member 71, preferably a screw, which is vertically adjustable to register the flange 66 with the horizontal plane in which the trimming cutters 21 and 22 execute their shearing cut. The screw 71 is carried by a supporting arm 72 which is one of a pair of cooperative clamping jaws. It is affixed to a head 73 that is formed with a stem 74, and the stem is journaled in a two-part bracket 51, 55, which is affixed to the frame 15 by a clamping screw 59 and a plate 60. These parts are mortised into the frame between shoulders 58 thereof.

The upper jaw 75 is connected to the head 73 by a pivot pin 76 and carries at its free end an axially adjustable sleeve 77 and a set-screw 78 for fastening the sleeve in various positions. A plunger 79 is arranged to slide in the sleeve 77 and is normally depressed by a compression spring 80 but is retained in the sleeve by a head 81. The plunger 79 is bored to provide a bearing for the stem 82 of a freely rotatable work-securing member 83 arranged to stand in coaxial relation to the holder 68 when the parts are in their operative positions, as shown by Figs. 1 and 3. The connection between the member 83 and the plunger 79 is maintained by a pin 84 extending through the plunger tangentially to the stem 82 and intersecting a groove 85 formed in the stem. This connection permits the stem to rotate relatively to the plunger.

The spring 80 furnishes clamping pressure to the member 83 and counteracts various thicknesses of work so that the upper jaw 75 may be depressed in every case to a predetermined relation to the lower jaw in which the work-engaging members 83 and 68 will be coaxial. For example, a set-screw 86 carried by the jaw 75 is arranged to contact with the jaw 72 to limit the closing movement of the latter, and, in practice, it is adjusted to limit the closing movement at the point where the axis of the member 83 coincides with that of the member 68. Thus, when the jaw 75 is fully closed the member 83 will have a full circle of contact with the work but will yield relatively to said jaw according to the thickness of the work and the adjustment of the sleeve 77.

A handle 87 is provided to effect clamping movement of the jaw 75 and to move the jaws and the work toward and from the cutters. For this purpose a collar 88 is fixed to the lower end of the stem 74 and the handle is connected to this collar by a pivot pin 89 the axis of which is transverse to that of the stem 74. This connection is such that lateral movement of the handle will oscillate the stem 74 to present the work to the cutters and to retract it therefrom while the up-and-down movement of the handle about the axis of the pin 89 may be utilized to clamp and release the article of work. For the latter purpose the handle is connected to the upper jaw 75 by a link 90 which is preferably a turn buckle.

In using this type of work holder the operator will first adjust the screw 71 to raise or lower the member 68, as may be necessary, to locate the flange 66 at the correct level relative to the cutters. A set-screw 91 is provided to hold the adjusting screw 71 at the desired position. Assuming that an article 65 has been mounted on the holder 68 for this purpose, the operator next depresses the handle 87 to close the clamping jaw 75 as far as the stop screw 86 will permit. If the article of work is too thick to permit the jaw 75 to close to the predetermined position hereinbefore defined, the condition may be rectified by raising the bearing sleeve 77 relatively to the jaw 75 after loosening the set screw 78, but ordinarily the type of work holder will not differ so much as to require frequent adjustment of this sleeve.

Having made all the necessary adjustments for a given lot of articles to be trimmed, the operator will manipulate the handle 87 with the left hand and insert and remove the articles of work with the right hand. While the clamping jaws 72, 75 are retracted from the cutters, the operator holds them open for the reception of an article of work by raising the handle 87, and having placed the article on the holder 68, as shown by Fig. 3, the operator first depresses the handle to secure the work to the holder and then swings the handle laterally to present the work to the cutters, as shown by Figs. 1 and 2. Incidentally to depressing the jaw 75, the securing member 83 will engage the top surface of the article 65 before the stop screw 86 engages the jaw 72, and at this moment the angular position of the jaw 75 is such that the axis of the member 83 is inclined relatively to the axis of the work holder 68. Nevertheless, the spring 80 is adapted to yield so that the jaw 75 and the sleeve 77 may continue to move downwardly until they are arrested by the stop screw 86, and the effect of this continuing movement is to rectify the angle of the axis of the member 83 so that when the downward movement of the jaw 75 is finally arrested by the screw 86 the axis of the member 83 will coincide with that of the member 68. The work may now be presented to the cutters by swinging the handle 87 about the axis of the stem 74, and as the flange 66 of surplus rubber is attacked by the cutters the cut approaches the body of the article 65 tangentially, as indicated at 92 in Fig. 2, and the article is rotated by the drag of the cutters until the entire flange is trimmed off. The operator may then swing the handle 87 to retract the trimmed article from the cutters and then raise the handle to lift the securing member 83 so that the trimmed article may be removed and another article mounted in its place. In case the article of work has a flange of overflow in the plane indicated by dotted lines 93 in Fig. 3, the preferred method of procedure to trim it off would be to mount the article 65 in an inverted position. Accordingly the securing member 83 is formed with a cavity 69 like that formed in the holder 68 to receive the stud portion 67.

A segmental guard 94 (Fig. 1) may be attached to the bracket 25 behind but adjacent to the cutter 22 to prevent the trimmed material from being carried around by the cutter and thereby wound upon the shaft 17.

The type of work holder shown by Figs. 4, 5, 6 and 7 is adapted to be used to trim an equatorial flange 95 of overflow from a rubber ball 96. This type of work holder is similar to that shown in Fig. 1 in that it comprises the jaws 72, 75, the adjusting screw 71, the axially adjustable sleeve 77, the set-screw 78, the plunger 79, the compression spring 80, the oscillatory member 73 and stem 74, the pivot pin 76, the handle 87 fastened to the stem 74, the link 90 for operating the jaw 75, and the stop-screw 86 for limiting the closing movement of the jaw. The work-engaging members 97 and 98 are, to all intents and purposes, similar to the corresponding members 68 and 83 shown in Fig. 3, in that they are freely rotatable relatively to the members 71 and 79 in which they are mounted, but they are given other proportions better suited to the spherical surface of the article of work to be held by them.

In addition to the elements above recited this type of work holder includes a ring-shaped member 100 that centers the ball 96 relatively to the members 97 and 98 and that also locates the flange 95 in a predetermined plane at right angles to the axis of the members 97 and 98. The ring member 100 is affixed to a shank piece 101 and the latter is arranged in a space between two spaced portions 102 of the jaw 72 so that it may play up and down between said portions. The shank piece 101 is connected to the spaced portions 102 by a pivot pin 103 and is engaged by a compression spring 104 the effect of which is to support the ring member 100 at a level determined by a pin 105 fastened in the shank piece 101 and arranged to abut against the lower surface of the jaw 72. When the ring member 100 is elevated to the highest position permitted by the pin 105 it occupies the position shown by Fig. 5. In this position the ring member is substantially horizontal.

The jaw 75 is provided with a screw 106 the function of which is to displace the ring member 10 from engagement with the ball when said jaw is depressed as shown by Figs. 4 and 6. The ring member is detachable relatively to the shank piece 101 to provide for using ring members of various sizes according to the sizes of the balls to be trimmed. For this reason an attaching screw 107 and a dowel pin 108 (Fig. 5) are preferably provided to affix the ring member to the shank piece 101.

Having attached a ring member 100 of suitable size for the balls to be trimmed, the operator will place a ball in the ring member, as shown by Fig. 5, so that the ball will be supported by its flange 95. The next step is to adjust the screw 71 so that the member 97 will stand close to the bottom of the ball but still clear the latter sufficiently to avoid any interference with the registering effect of the ring member with regard to locating the flange 95 in the desired predetermined plane at right angles to the polar axis 109 (Fig. 5) about which the ball will rotate while being trimmed.

Having adjusted the work-engaging member 97 to the desired level as above explained, the operator will depress the handle 87 to close the jaw 75, and when this jaw is near its lower limit the screw 106 engages the shank piece 101 to displace the ring member 100 from the ball. The ball therefore settles into the supporting holder 97 and is clamped thereto by the securing member 98, as shown by Figs. 4 and 6. The closing movement of the jaw 75 is arrested by the stop screw 86 at a position in which the axis of the member 98 coincides with the polar axis 109. The ball and the two members 97, 98 by which it is clamped are thus positioned to rotate about a common axis at right angles to the plane of the flange 95, the spring 80 having yielded during the closing movement of the jaw 75 to permit this coaxial relation of the members 97, 98 to be brought about.

The stem 74 of the clamping jaws is journaled in a bracket 51 similar to that hereinbefore described to permit the jaws to be moved collectively toward and from the trimming cutters, and when the operator has moved the handle 87 as aforesaid to clamp the ball the next step is to swing the handle laterally in a direction to carry it to the cutters.

As the flange 95 moves into the field of trimming it is attacked by the cutters with a cut that progresses tangentially to the body of the ball as indicated at 111 in Fig. 7. The ball and the members 97 and 98 by which it is held are rotated by the drag of the cutters, with the result that the flange 95 is trimmed off flush with the body of the ball in a little more than one complete rotation of the latter. The operator then moves the handle 87 to retract the trimmed ball from the cutters, raises the handle 87 to release the ball, removes the ball from the ring 100, and inserts another ball.

As shown by Fig. 7, the ring member 100 is cut away at one side to clear the cutter 21, but the segment thus removed from the ring member does not militate against the performance of the functions hereinbefore described.

Having thus described my invention, what I claim as new and desire to secure by Letters Patent of the United States is:

1. In a machine for trimming an annular flange of overflow from a molded rubber article of circular cross-section, the combination with a pair of cooperative rotary trimming cutters, of a pair of clamping jaws movable collectively to present an article of work to said cutters, said jaws having rotatable members for engaging and holding the article so that it may be rotated by the drag of said cutters, and a handle arranged to actuate said jaws relatively one to the other to clamp the article and to move said jaws collectively to present the clamped article to said cutters.

2. In a machine for trimming the overflow from molded rubber articles, the combination with trimming means, of a holder rotatable to present successive portions of the periphery of a circular article progressively to the trimming means, a support for the holder movable to carry the holder from a work-receiving position at a safe distance from the trimming means to a position to present the article to the trimming means, means arranged to secure the article to the holder against accidental dislodgment while it is being trimmed, and a control member constructed and arranged to operate the work-securing means and to move it and said holder toward and from the trimming means.

3. In a machine for trimming an annular flange of overflow from a molded rubber article of circular cross-section, the combination with trimming means, of a rotatable holder for said article, a movable support for carrying said holder toward and from said trimming means, and means carried by said support for securing the article to said holder against accidental dislodgment, said securing means including a work-engaging element and an operating handle by which the latter may be operated to secure and release the article and by which said support may be moved as aforesaid.

4. In a machine for trimming an annular flange of overflow from a molded rubber article of circular cross-section, the combination with trimming means, of a rotatable holder for said article, a support arranged to turn about an axis to carry said holder toward and from said trimming means, and means carried by said support to secure the article on said holder against accidental dislodgment, said securing means including an operating handle movable relatively to said support to secure and release the article but connected to said support so that the latter may be turned thereby about said axis to present the article to said trimming means.

5. A trimming machine comprising trimming means, a handle movable about two axes transverse to each other, means operable by movement of said handle about one of said axes to clamp an article of work, and means operable by movement of said handle about the other one of said axes to carry said clamping means toward and from said trimming means.

6. A trimming machine comprising a pair of cooperative rotary trimming cutters, a pair of clamping jaws movable collectively to present an article of work to said cutters, said jaws having rotatable cooperative work-engaging members for holding the article between them so that it may be rotated by the drag of said cutters, and a handle arranged to actuate said jaws relatively one to the other to clamp and release the article and to move said jaws collectively to present the clamped work to the trimming cutters.

7. A trimming machine comprising trimming means, a support, and a pair of clamping jaws arranged on said support and pivotally connected to each other to provide for relative opening and closing movement, said jaws having rotatable cooperative work-engaging members for holding an article of work between them, one of said jaws and the work-engaging member carried thereby having a resilient connection to compensate for various thicknesses of work units so that the jaws may be closed in every case to a predetermined relation in which said work-engaging members will be coaxial, said jaws being movable relatively to said support to present the clamped article to said trimming means in a predetermined relation thereto.

8. A trimming machine comprising a pair of bearing members spaced apart, a pair of freely rotatable work-clamping members mounted in said bearing members respectively to turn relatively to them through more than 360 degrees while clamping a work-piece, a spring by which one of said clamping members is caused to apply clamping pressure to a work-piece located between them, and cutting means constructed and arranged to rotate a work-piece so clamped and to cut a closed circuit around the work-piece.

9. A trimming machine comprising trimming means, a support, two cooperative jaws arranged on said support and having relatively movable work-engaging members arranged to clamp an article of work and rotate therewith about a common axis, means for relatively moving said jaws to clamp the article, said jaws being movable relatively to said support to present the article to said trimming means, and means carried by and movable relatively to one of said jaws for registering the article relatively to said clamping members, said registering means being also arranged to be displaced from the work by relative closing movements of said jaws to free the article for rotation.

10. A trimming machine comprising means for trimming an annular flange of overflow from a molded rubber article of circular cross-section, a support, two cooperative jaws movably arranged on said support and having work-engaging members arranged to clamp the article and rotate therewith, means for effecting relative clamping movement of said jaws, and means arranged to register the article between said members and support it initially by said flange, said registering means being also arranged to be displaced from the article by relative closing movement of said jaws to free the article for rotation, and said jaws being movable to present the clamped article to said trimming means.

11. A machine for trimming an equatorial flange of overflow from a rubber ball, comprising a pair of cooperative rotary trimming cutters, a support, two cooperative jaws arranged on and movable relatively to said support to present the ball to said trimming cutters, said jaws having work-engaging members arranged to clamp the ball adjacent to its poles and rotate therewith about its polar axis, means for effecting relative clamping movement of said jaws, and means for registering the ball relatively to said rotary work-engaging members.

12. A machine for trimming an equatorial flange of overflow from a rubber ball, comprising a pair of cooperative rotary trimming cutters, a support, two cooperative jaws arranged on and movable relatively to said support to present the ball to said trimming cutters, said jaws having work-engaging members arranged to clamp the ball adjacent to its poles and rotate therewith about its polar axis, means for effecting relative clamping movement of said jaws, and means for registering the ball relatively to said rotary work-engaging members, said registering means being arranged initially to engage said flange and register it with a plane at right angles to the axis of said rotary work-engaging members, and said registering means being also arranged to be displaced from the ball by relative closing movement of said jaws to free the ball for rotation.

13. A machine for trimming an equatorial flange of overflow from a rubber ball, comprising a pair of cooperative rotary trimming cutters, a support, two cooperative jaws arranged on and movable relatively to said support to present the ball to said cutters, said jaws having work-engaging members arranged to clamp the ball adjacent to its poles and rotate therewith about its polar axis, means for effecting relative clamping movement of said jaws, and means for registering the ball relatively to said rotary work-engaging members, said registering means being arranged initially to support the ball by its said flange and being also arranged to be disengaged from said flange by relative closing movement of said jaws to free the ball for rotation.

14. A machine for trimming an equatorial flange of overflow from a rubber ball, comprising trimming means, a support, two cooperative jaws arranged on and movable relatively to said support to present the ball to said means, said jaws having work-engaging means arranged to clamp the ball adjacent to its poles and rotate therewith about its polar axis, means for effecting relative clamping movement of said jaws, and a ring mounted on one of said jaws to surround the ball and register it relatively to said rotary work-engaging members, a portion of said ring being omitted to clear said trimming means so that the latter may trim the flange flush with the body of the ball.

15. A machine for trimming an equatorial flange of overflow from a rubber ball, comprising trimming means, two cooperative jaws having work-engaging members arranged to clamp the ball adjacent to its poles and rotate therewith about its polar axis, means for supporting said jaws so that they may be moved collectively to present the ball to said trimming means, a ring-shaped member carried by one of said jaws to center the ball and locate the flange thereof in a predetermined position, said ring-shaped member being displaceable to clear the ball while the latter is clamped, and an operating handle arranged to move said jaws collectively as aforesaid and to displace said ring-shaped member from the ball.

In testimony whereof I have signed my name to this specification.

SIDNEY J. FINN.